United States Patent
Schroth (10) Patent No.: US 9,424,287 B2
(45) Date of Patent: Aug. 23, 2016

(54) CONTINUOUS, AUTOMATED DATABASE-TABLE PARTITIONING AND DATABASE-SCHEMA EVOLUTION

(75) Inventor: Albrecht Schroth, Herrenberg (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 1746 days.

(21) Appl. No.: 12/316,712

(22) Filed: Dec. 16, 2008

(65) Prior Publication Data

US 2010/0153349 A1 Jun. 17, 2010

(51) Int. Cl.
*G06F 17/30* (2006.01)
*G06F 17/24* (2006.01)

(52) U.S. Cl.
CPC ........ *G06F 17/30306* (2013.01); *G06F 17/245* (2013.01); *G06F 17/248* (2013.01); *G06F 17/30312* (2013.01)

(58) Field of Classification Search
CPC ............ G06F 17/30306; G06F 17/245; G06F 17/248; G06F 17/30312
USPC .......... 707/792, 793, 802, 804, 810, 812, 968
See application file for complete search history.

(56) References Cited

U.S. PATENT DOCUMENTS

| | | | | |
|---|---|---|---|---|
| 6,202,070 | B1 * | 3/2001 | Nguyen | ..................... G06F 8/61 |
| 6,223,182 | B1 * | 4/2001 | Agarwal | ........... G06F 17/30595 |
| 6,691,166 | B1 * | 2/2004 | Gasior | ............. G06F 17/30584 |
| | | | | 707/999.001 |
| 6,985,895 | B2 * | 1/2006 | Witkowski et al. | ........... 707/696 |
| 7,171,399 | B2 * | 1/2007 | Kapoor et al. | |
| 7,299,239 | B1 * | 11/2007 | Basu et al. | |
| 7,870,174 | B2 * | 1/2011 | Eadon et al. | .................. 707/953 |
| 2003/0093374 | A1 * | 5/2003 | Fenlon et al. | ................... 705/40 |
| 2004/0243555 | A1 * | 12/2004 | Bolsius | ............. G06F 17/30471 |
| 2004/0267782 | A1 * | 12/2004 | Nakano et al. | ................ 707/100 |
| 2005/0038767 | A1 * | 2/2005 | Verschell et al. | .................. 707/1 |
| 2005/0251524 | A1 * | 11/2005 | Shukla | ............. G06F 17/30321 |
| 2005/0257204 | A1 * | 11/2005 | Bryant | .................. G06F 3/0481 |
| | | | | 717/163 |
| 2007/0078826 | A1 * | 4/2007 | Bozkaya et al. | ................... 707/3 |
| 2007/0130171 | A1 * | 6/2007 | Hanckel | ............ G06F 17/30551 |
| 2007/0226755 | A1 * | 9/2007 | Kilian-Kehr | .................. 719/318 |
| 2008/0098045 | A1 * | 4/2008 | Radhakrishnan | . G06F 17/30551 |
| 2008/0256029 | A1 * | 10/2008 | Abrink | ............. G06F 17/30339 |
| 2009/0198715 | A1 * | 8/2009 | Barbarek | ............ G06F 17/2264 |
| 2009/0204782 | A1 * | 8/2009 | Barbarek et al. | ............. 711/173 |
| 2009/0234800 | A1 * | 9/2009 | Antani et al. | ..................... 707/2 |
| 2009/0282055 | A1 * | 11/2009 | Grant | ........................... 707/100 |
| 2009/0287731 | A1 * | 11/2009 | Motoyama | ........... G06Q 10/109 |

OTHER PUBLICATIONS

Introducing DB2 9, Part2: Table partitioning in DB2 9 (pubished May 24, 2006), IBM, pp. 1-7.*

* cited by examiner

*Primary Examiner* — Tony Mahmoudi
*Assistant Examiner* — Merilyn Nguyen
(74) *Attorney, Agent, or Firm* — Olumpic Patent Works PLLC (57) ABSTRACT

Methods and apparatus are disclosed to provide continuous, automated database-table partitioning and database-schema evolution. In one example, the disclosed methods and apparatus for automatically partitioning a logical table include monitoring a database operation to detect a partition-invoking event associated with the logical table, wherein the monitoring of the database operation is initiated in response to a table creation command that includes a partition-by constraint specifying a column of the logical table or of a different table, and, when a partition-invoking event occurs and is detected by the monitoring of the database operation, creating the next partition for the logical table and storing the next partition in a computer-readable medium.

14 Claims, 8 Drawing Sheets

Figure 1A

Table Sites (100)

| SID | Name | City | Country | Address | No. of Employees | Year |
|---|---|---|---|---|---|---|
| 102 | 103 | 104 | 105 | 106 | 107 | 108 |

Table Site Personnel (110, 120)

| PID | Last Name | First Name | SID | Home Address | Home Phone | Work Phone |
|---|---|---|---|---|---|---|
| 122 | 124 | 126 | 128 | 130 | 132 | 134 |

| PID | Last Name | First Name | SID | Home Address | Home Phone | Work Phone |
|---|---|---|---|---|---|---|
| | | | | | | |
| | | | | | | |
| | | | | | | |

501

| PID | Last Name | First Name | SID | Home Address | Home Phone | Work Phone |
|---|---|---|---|---|---|---|
| | | | | | | |
| | | | | | | |
| | | | | | | |

502

| PID | Last Name | First Name | SID | Home Address | Home Phone | Work Phone |
|---|---|---|---|---|---|---|
| | | | | | | |
| | | | | | | |
| | | | | | | |

503

· · ·

| PID | Last Name | First Name | SID | Home Address | Home Phone | Work Phone |
|---|---|---|---|---|---|---|
| | | | | | | |
| | | | | | | |
| | | | | | | |

CONTINUOUS, AUTOMATED DATABASE-TABLE PARTITIONING AND DATABASE-SCHEMA EVOLUTION

TECHNICAL FIELD

The present invention is related to database-management systems and, in particular, to efficient database partitioning, on an on-going and as-needed basis.

BACKGROUND OF THE INVENTION

At a fundamental level, all computer systems, including the initial primitive vacuum-tube-based computer systems developed in the 1940's, are data-storage machines which execute symbol-transformation operations on stored data. Initially, data was stored in small, volatile electronic memories within computer systems and on punched cards input to computer systems. As the capabilities of computer systems, and uses to which computer systems were put, rapidly expanded, a wide array of different types of volatile and non-volatile data-storage components were developed for computer systems, as well as computational subsystems and logical entities to facilitate creation, storage, retrieval, alteration, input, and output of data. Ultimately, separate database-management systems were developed to provide even higher-level database-management functionality.

Currently, very complex and highly capable database-management systems of a variety of different types are commercially available for managing data on a broad range of computer systems from personal computers all the way up to highly complex, distributed computer systems in which data is stored and managed over large numbers of computer systems and mass-storage systems interconnected by a variety of different communications media. Relational-database-management systems, based on a relational algebra that provides relatively simple and logical constructs and algebraic operations on those constructs, were initially developed in the late 1960's and 1970's, and continue to provide useful, flexible, and powerful database management in today's sophisticated, highly-distributed computing environments. The capacities and capabilities of relational-database-management systems have continued to increase, in parallel with the evolution of computing hardware and operating systems, and many powerful and useful tools and utilities for monitoring the performance of, and modifying, relational-database-management systems have been developed to provide managers and administrators with needed functionality for administering data storage, data retrieval, and querying of stored data in modern computing environments. The development of database monitoring and management tools continues to attract large efforts from researchers, academicians, database-management-system designers and vendors, designers and manufacturers of computer hardware, and, ultimately, individual and corporate users of database-management systems.

DETAILED DESCRIPTION OF THE INVENTION

Embodiments of the present invention are directed to methods and computational subsystems employed in database-management systems that continuously partition relational-database tables in order to ameliorate database-management-system execution bottlenecks and inefficiencies. Certain embodiments of the present invention employ the creation and instantiation of templates in order to continuously partition a database, while other embodiments of the present invention provide high-level-interface support for on-going relational-database-table partitioning.

Certain embodiments of the present invention are directed to database-schema modification in order to ameliorate computational bottlenecks and inefficiencies within a database-management system. In the following discussion, embodiments of the present invention are discussed in the context of relational database systems. Just as relational database systems are based on a relatively simple, but powerful and general algebra upon which database schemas can be developed for organizing and managing databases, relational database systems provide an easy-to-understand context for discussing method and system embodiments of the present invention. However, embodiments of the present invention are applicable not only to the relational-database context, but may find application and utility in other types of database-management systems.

Figure 1A:
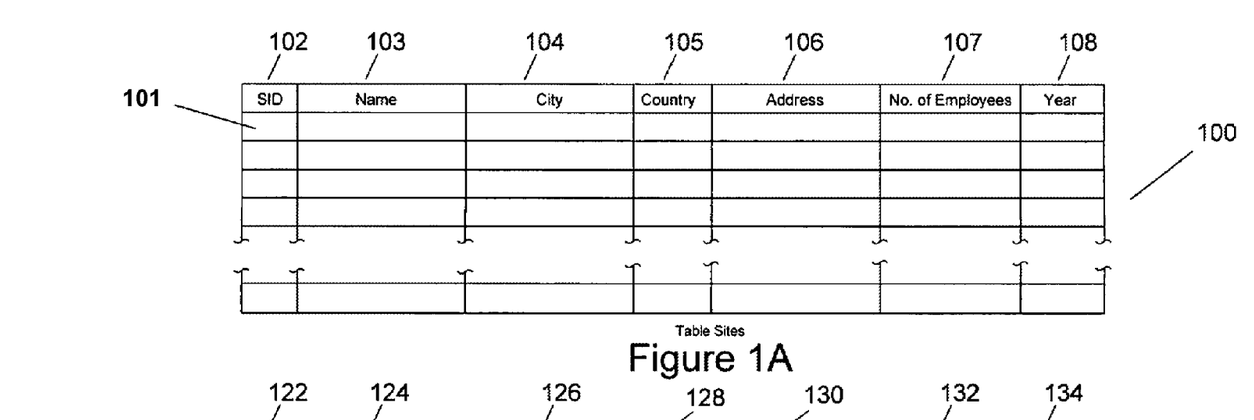
FIGS. 1A-B illustrate two relational-database tables that provide a context for discussion of the present invention.
Figure 1B:
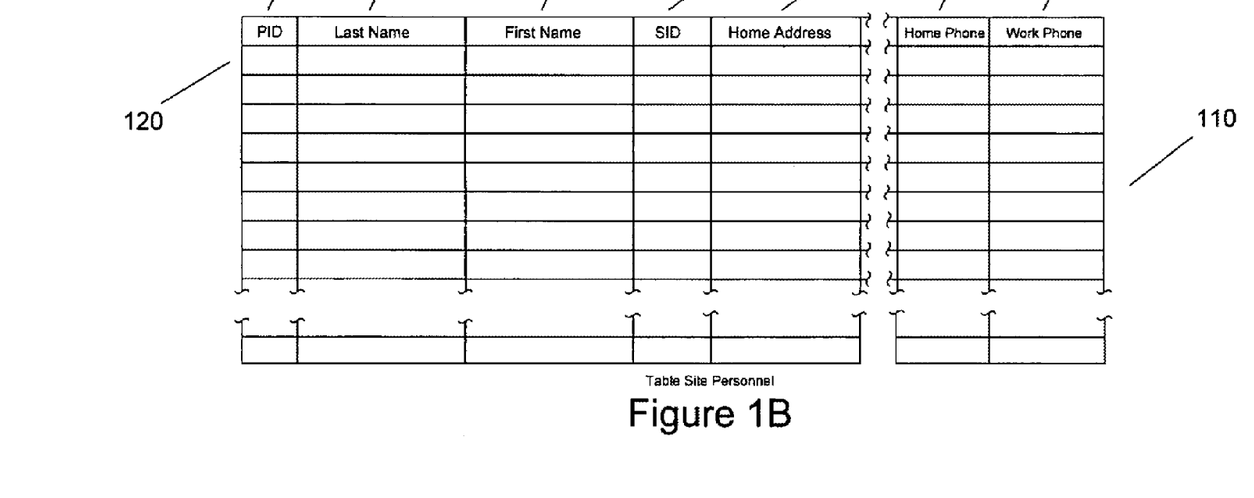

FIGS. 1A-B illustrate two relational-database tables that provide a context for discussion of the present invention. The relational-database table "Sites," shown in FIG. 1A, stores information about the different sites that together compose a large corporation, and the relational-database table "SitePersonnel," shown in FIG. 1B, describes the employees of the corporation. A relational-database table is a logical entity, or construct, defined by a database-schema-creation language. Each table, such as the table "Sites," includes a number of columns 102-108 and a number of rows, such as row 101 in the table "Sites." The columns are equivalent to fields defined for a record or structure. Columns are associated with data types, and describe the values of particular attributes associated with each logical entity represented by a row in the table. For example, each row, such as row 101, in the table "Sites" 100 represents a different site, such as a manufacturing facility, distribution facility, corporate office, or other site within a corporation. Each site is characterized by: (1) a site ID, corresponding to column "SID" 102; (2) a name, corresponding to column "Name" 103; (3) a city in which the site is located, corresponding to the column "City" 104; (4) a country in which the site is located, corresponding to column "Country" 105; (5) an address in which the site is located, corresponding to the column "Address" 106; (6) a current number of employees at the site, corresponding to the column "NumberOfEmployees" 107; and (7) a year in which the site was established, corresponding to the column "Year" 108. It may be convenient to represent years by integers, addresses by varying-length character strings, and to choose other such data types suitable for the attribute represented by each of the columns of the table. Similarly, each employee of the company is represented by a row, such as row 120, in the table "SitePersonnel" 110. The table "SitePersonnel" includes various different columns corresponding to different attributes of employees, including column (1) an employee identifier "PID" 122; (2) an employee last name corresponding to column "LastName" 124; (3) the first name of an employee, corresponding to column "FirstName" 126; (4) the identifier of the site in which the employee works, corresponding to column "SID" 128; (5) the home address of the employee, corresponding to column "HomeAddress" 130; (6) the home phone number of the employee, corresponding to column "HomePhone" 132; and (7) the work phone of the employee, corresponding to column "WorkPhone" 134.

The schema for a database defines all of the relational tables in the database, as well as additional types of database entities, including triggers, constraints, views, and indexes. A database-management system generally provides both a schema-definition language and a query language. In the case of relational-database-management systems, the Sequential Query Language ("SQL") provides both for schema definition and query construction. Database-management systems also provide a host of additional tools for integration of functionality expressed in procedural-language routines, a large array of database monitoring and management tools and utilities that allow a database administrator to analyze operation of a database-management system, identify sources of problems, and modify the database schema to address those problems, and various additional functionalities, tools, utilities, and features. Numerous textbooks and research papers provide thorough descriptions and discussions of various types of database-management systems, including relational-database-management systems.

The following SQL commands illustrate how the tables "Sites" and "SitePersonnel," discussed above with reference to FIGS. 1A-B, can be defined in SQL:

```
CREATE TABLE Sites
(
    SID              INTEGER PRIMARY KEY,
    Name             VARCHAR(20),
    City             VARCHAR(20),
    Country          CHAR(3),
    Address          VARCHAR(100),
    NumberOfEmployees INTEGER,
    Year             SMALLINT);
CREATE TABLE SitePersonnel
(
    PID              INTEGER PRIMARY KEY,
    LastName         VARCHAR(20),
    FirstName        VARCHAR(20),
    SID              INTEGER REFERENCES Sites(SID),
    HomeAddress      VARCHAR(100),
    .
    .
    .
    HomePhone        CHAR(12),
    WorkPhone        CHAR(12));
```

SQL is a non-procedural language, unlike many commonly used programming languages, such as C, C++, and Java. There are many different ways to express any particular query or schema-object creation in SQL, and there are many different dialects of SQL. The above samples are intended only to provide an illustration of how the above-discussed tables can be created, but are not intended to represent executable commands in any particular dialect of SQL or any particular relational-database-management system. Entering these commands into an interactive SQL command environment, provided by a relational database system, or execution of a file containing the above-illustrated create-table commands, causes the relational-database-management system to create empty Sites and SitePersonnel tables, as illustrated in FIGS. 1A-B. Additional commands, including INSERT, SELECT, and UPDATE, may be used to insert rows into tables, alter the contents of rows already entered into tables, and retrieve rows from tables, respectively.

Figure 2:
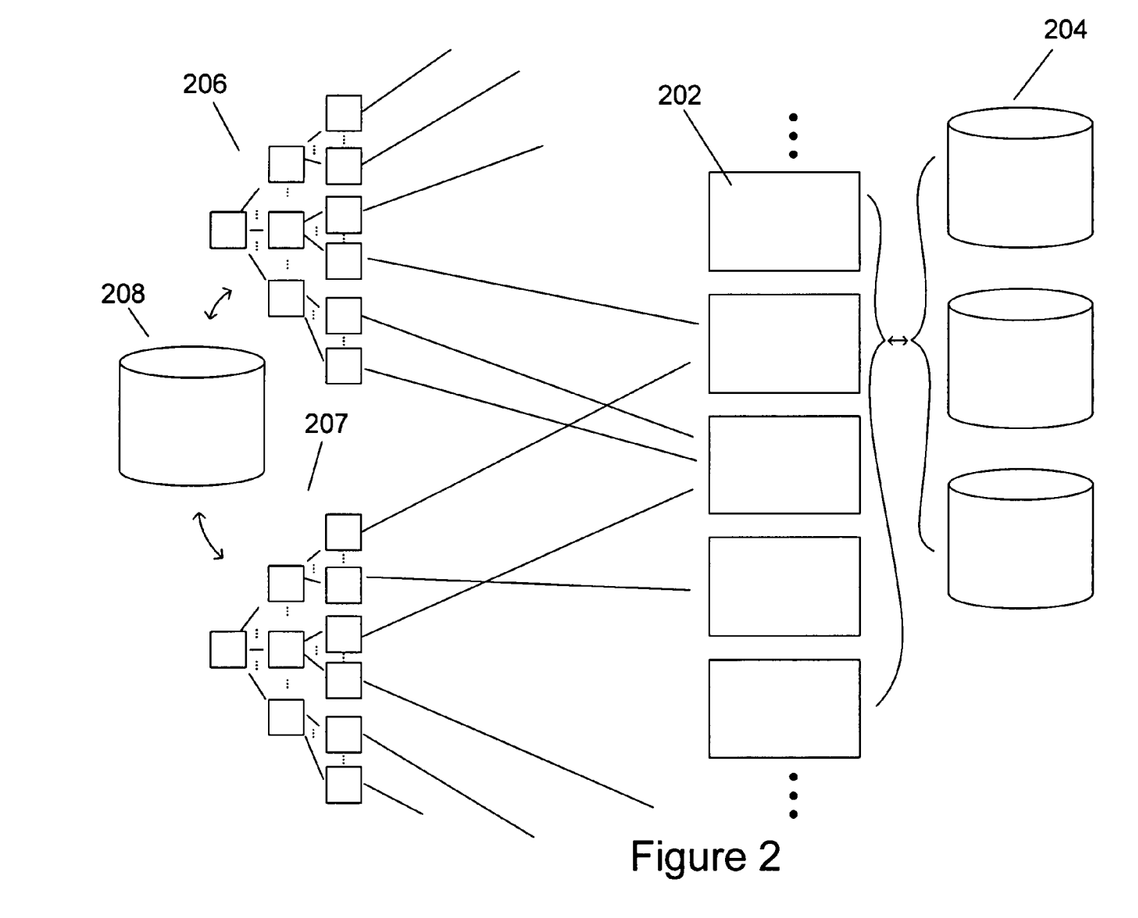
FIG. 2 illustrates implementation of a relational-database table.

While tables can be created and managed using SQL entered through any of various SQL-processing interfaces, the actual physical tables are complex computational objects stored within one or more computer systems. FIG. 2 illustrates implementation of a relational-database table. The rows of the relational-database table are generally stored both in memory blocks, such as memory block 202 in FIG. 2, within one or more computer systems as well as on one or more mass-storage devices, such as mass-storage device 204. Rows are continuously read into memory from the mass-storage devices and written from memory back to the mass-storages devices. Rows are read into memory in order that various commands can be executed on, or using, the data contents of rows. However, relational-database tables are often far too large to be read entirely into memory, and are therefore swapped between mass-storage devices and memory just as an operating system swaps the contents of virtual memory between electronic memory and mass-storage devices. The values of the attributes for each data entity stored in a table, or, in other words, the contents of the columns for a given row, are encoded as binary data stored with electronic memory and/or on mass-storage devices. Rows may be sequentially stored in memory blocks, or may be stored across memory blocks in more complex storage schemes. In addition, the rows of a table are commonly indexed by one or more indexes 206-207. Indexes may be hierarchical tree-like indices, as shown in FIG. 2, or may involve other types of data structures, and are associated corresponding routines that use the index data structures for locating rows, inserting rows, and other operations performed on rows. Like the rows of the table, the indexes may also be stored both in memory as well as on one or more mass-storage devices 208, and may be continuously read into memory for the mass-storage devices and written from memory back to the mass-storage devices as needed for supporting index-based operations.

Figure 3:
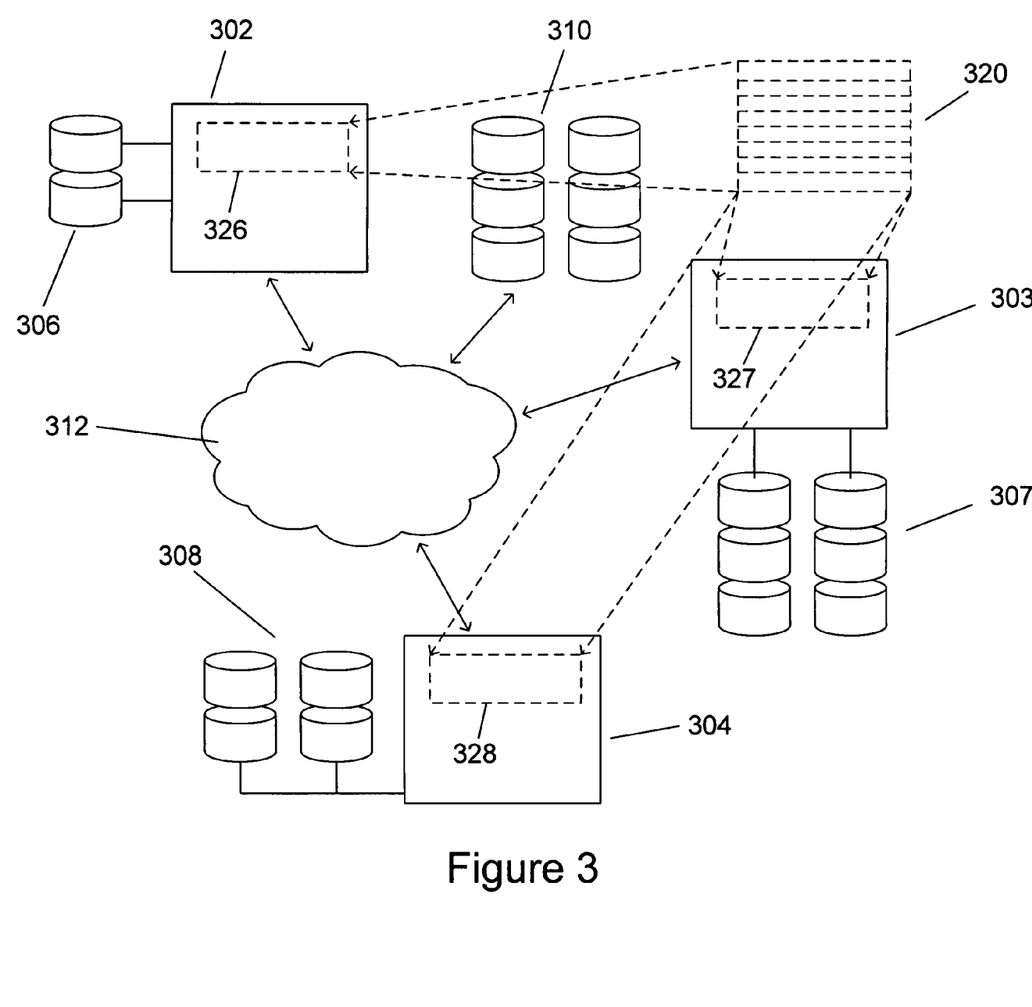
FIG. 3 illustrates a distributed database-management system.

In modern database-management systems, databases may be distributed across many different computer systems. FIG. 3 illustrates a distributed database-management system. The database-management system shown in FIG. 3 comprises three large mainframe computers 302-304, each with attached mass-storage devices 306-308, respectively, and an independent mass-storage system, such as a high-end RAID system 310, all interconnected to one or more communications media 312. Users running database applications on host computers address queries to the distributed database system via the communications media 312. In certain cases, one or a few of the computer systems of the distributed database system may receive and coordinate execution of queries, and, in other cases, any system within the distributed system may receive and coordinate execution of queries. As illustrated in FIG. 3, a particular relational-database table 320 and execution of operations applied to the database table may be distributed across two or more of the computer systems within a distributed database system. In FIG. 3, portions of the relational-database table 326-328 are stored and managed in each of the three different computer systems 302-304, respectively. The relatively straightforward logical abstraction of a relational-database table, as discussed with reference to FIGS. 1A-B and illustrated in the above create-table sequel commands, may be computationally and physically implemented by extremely sophisticated and extremely complex underlying processes operating on data stored in various components of various computer systems, generally redundantly, to allow for robust failure recovery. It is clearly well beyond the scope of the current application to describe such implementation details.

Consider the following case. A database administrator may initially create a corporate database that, in part, includes the table "Sites" and the table "SitePersonnel," discussed above with reference to FIGS. 1A-B. Initially, while the corporation is small, and before a large number of different applications have been developed to access and use the database, performance of the database in executing queries directed to the table "Sites" and the table "SitePersonnel" are quickly executed without significant performance bottlenecks or disparities in execution time under different system conditions. In many cases, overlying applications seek, for example, to extract information about an employee based on an employee ID, such as by the query:

| | |
|---|---|
| SELECT * | |
| FROM | SitePersonnel |
| WHERE | PID = 612307; |

However, over time, the corporation grows significantly, and many different sites are established throughout the world. As a result, the sizes, in rows, of both the table "Sites and the table "SitePersonnel" have grown enormously. Furthermore, an automated telephone-exchange program has been developed to allow callers to call employees within the corporation using an audio employee directory, implemented, in part, by retrieving the work phone numbers of employees from the database based on employee names. The automated telephone-exchange program frequently executes the following query in order to determine the workplace phone number of a particular employee at a particular site:

| | |
|---|---|
| SELECT | WorkPhone |
| FROM | SitePersonnel |
| WHERE | SID = 1761 |
| AND | LastName = 'Johnson' |
| AND | FirstName = 'Geraldine'; |

The automated telephone-exchange application may itself be distributed among many different, geographically dispersed and interconnected computer systems. Over time, ever-increasing usage of the automated telephone-exchange system results in severe performance degradation within the database system. Using database performance-monitoring and diagnostic tools, the database administrator discovers that, because of high frequency and volume of query executions for returning workplace phone numbers, there is extremely high and deleterious contention for certain of the top-level nodes in indexes on the table "SitePersonnel," as well as extremely high communications overhead involved in accessing the particular computer system on which the index is stored.

Currently available relational-database-management systems provide tools for monitoring database performance and detecting problems, such as the above-described problem. In addition, currently available database-management systems provide tools for partitioning problem tables in order to better distribute the tables and to therefore ameliorate performance bottlenecks and serious points of contention. While each different database-management system provides somewhat different tools, many relational-database-management systems provide tools for partitioning a table in order to better distribute the computational resources devoted to implementation of the table both within a single computer system as well as among the computer systems of a distributed computer system.

Figure 4:
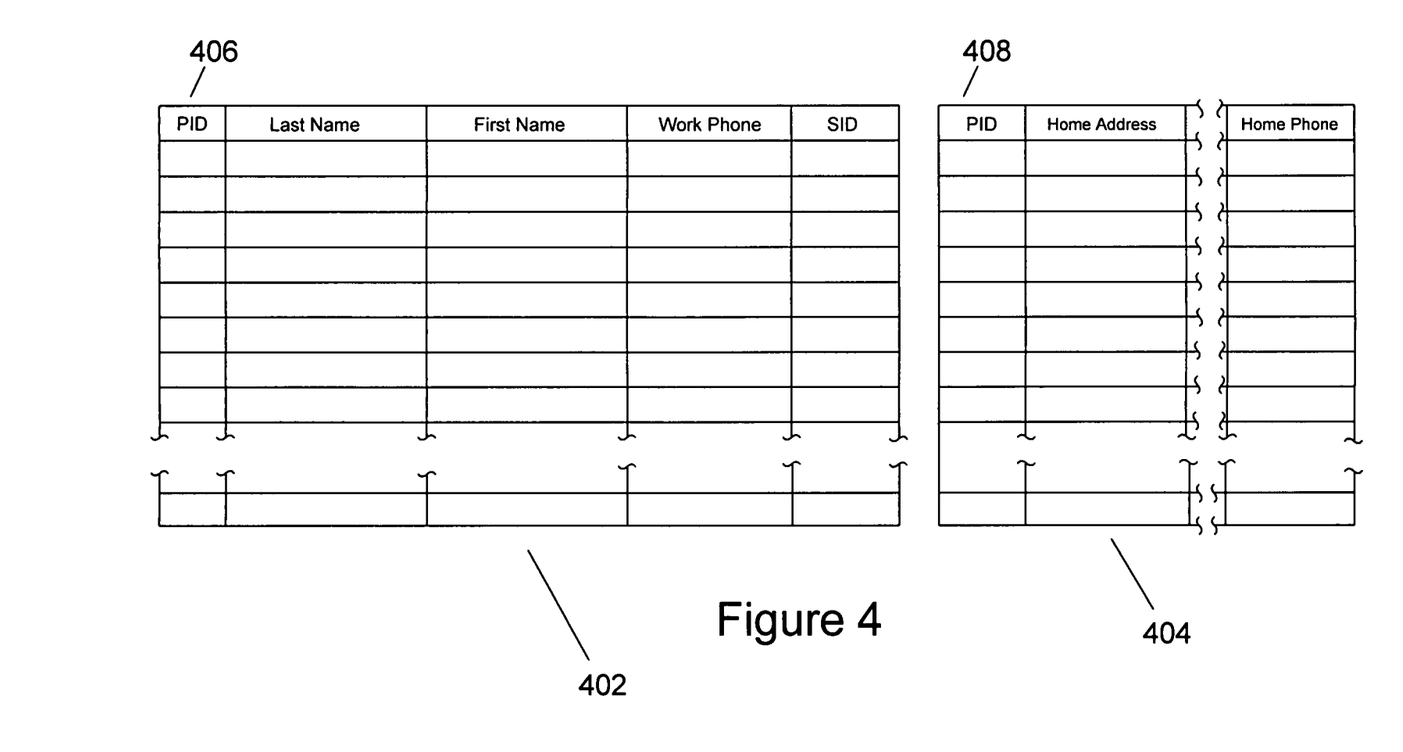
FIG. 4 illustrates vertical partitioning of a relational-database table.

FIG. 4 illustrates vertical partitioning of a relational-database table. The two tables 402 and 404 shown in FIG. 4, if combined together with elimination of one of the two employee-ID columns 406 and 408, would together compose the table "SitePersonnel" (110 in FIG. 1B). The database administrator may use a vertical partitioning tool to decompose the table SitePersonnel into the two tables shown in FIG. 4. By vertically partitioning the table "SitePersonnel," the database administrator may arrange for many of the automated telephone exchange application queries to be exclusively directed to table 402, while many other queries seeking additional information about employees may be directed to table 404. When patterns of query execution can be partitioned by partitioning an underlying relational-database table, various different performance bottlenecks and inefficiencies can be ameliorated. Of course, as discussed with reference to FIGS. 2 and 3, the underlying implementation of the partition table is potentially quite complex, and designating how and where the two tables resulting from vertical partitioning are stored and managed requires the use of a variety of different tools and utilities that are beyond the scope of the present invention.

Figure 5:
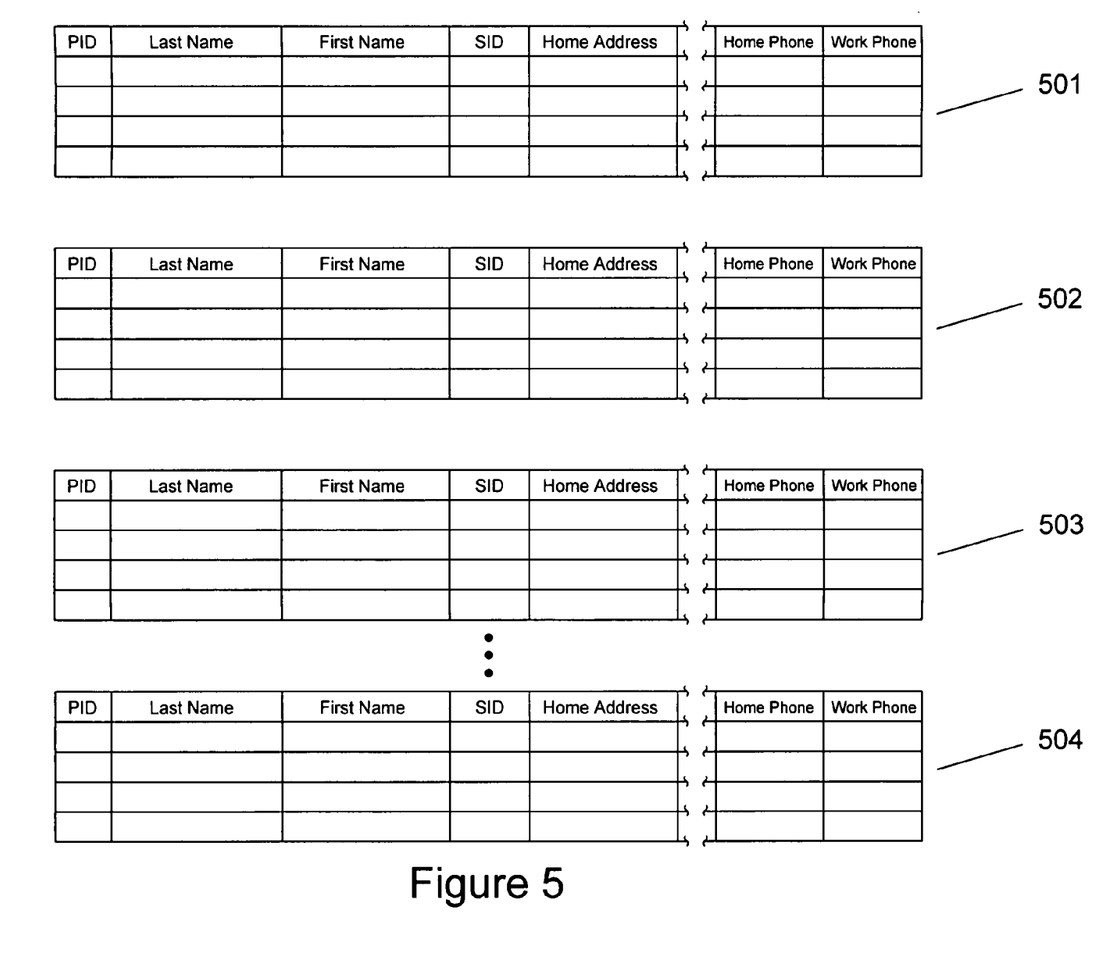
FIG. 5 illustrates a second type of relational-database-table partitioning, referred to as "horizontal partitioning."

FIG. 5 illustrates a second type of relational-database-table partitioning, referred to as "horizontal partitioning." As shown in FIG. 5, the table "SitePersonnel" (110 in FIG. 1B) has been horizontally partitioned into a number of smaller tables 501-504 that have the identical format of the original table "SitePersonnel." These tables 501-504 are smaller in the sense that they have a smaller number of rows. Continuing with the current example, the database administrator may arrange to create a smaller SitePersonnel table for each different site represented by a row in the table "Sites." This may provide many advantages. For example, a SitePersonnel table partition corresponding to a particular site may be collocated with that site, or placed within a computer system logically mapped to that site, so that database queries directed to personnel of particular sites end up being directed to, and executed on, machines or resources devoted to those sites. Contention for the SitePersonnel table is distributed among multiple systems, and communications overhead may be significantly reduced.

Currently available database-management systems provide a horizontal partitioning tool that allows a relational table to be partitioned into numerous, smaller partition tables of identical form based on the values in a particular column, referred to as the "partitioning column." A relational-database table may be horizontally partitioned so that all rows having a particular value in the partitioning column are placed into one partition table, or that all rows having a value within a specified range of values in the partitioning column are placed into one partition table, or that all rows having a value in the partitioning column specified in a list of values are placed into one partition table.

Continuing with the above example, the database administrator may decide to partition the original SitePersonnel table on the column SID (128 in FIG. 1B), resulting in a smaller partition table for each of the different corporate sites, each represented by a row in the Sites table. By issuing the partitioning command, and by properly administering various parameters and specifications by which the database-management systems stores and manages data, the database administrator can arrange for each of the smaller partition tables to be stored in, and managed by, a particular computer system that also executes a local portion of the automated telephone exchange application for each corporate site.

While relational-database-table partitioning is a valuable and useful tool, as described in the context of the above example, relational-database-table partitioning does suffer several disadvantages. One disadvantage is that relational-database-table partitioning is manually performed as a result of monitoring, by a database administrator, of the performance characteristics of a database system in order to identify problem tables. Performance may suffer due to inattention of the database administrator to performance issues or failure of the database administrator to properly interpret performance data in order to identify bottlenecks. Furthermore, unless the database administrator can anticipate performance problems, the performance of the database system generally suffers significant degradation before the problem is recognized, and the relational-database table partitioned in order to ameliorate the problem. A second disadvantage is a partitioning operation can be a very computationally expensive operation, and may significantly impact the database-management system during execution. Many large relational-database tables may have millions or billions of rows, and the relational table may be distributed, in a very complex fashion, over many different memory components of many different computer systems. Restructuring an already-existing large relational-database table may take many hours or days, and may involve a variety of different computational overheads, including memory and mass-storage device allocation overheads, table locking overheads, and computational overhead involved in identifying and correctly handling various inter-table constraints.

For the above reasons, more computationally and time-efficient methods for handling the contention and bottleneck problems discussed above in the context of the example relational tables Sites and SitePersonnel would be beneficial to manufacturers, vendors, and users of database-management systems.

One approach to more computational and time-efficient management of relational-database tables, that represents one embodiment of the present invention, is based on a new logical database entity referred to as a "template." A database template is, in certain ways, similar to templates provided by the C++ programming language. Consider a very concise implementation of a memory stack, provided below in C++:

```
 1 const int MAX = 100;
 2 class stack
 3 {
 4     private:
 5         int ptr;
 6         int data[MAX];
 7     public:
 8         void push(int i) {if (ptr >= 0) data[ptr--] = i;};
 9         int pop( ) {if (ptr < (MAX - 1)) return data[++ptr];
10             else return -10000000;};
11         stack( );
12 };
13 stack::stack( )
14 {
15     ptr = MAX - 1;
16 };
```

Implementation of the memory stack includes an array of integers, declared on line 6, into which integer values may be pushed by the push function, implemented on line 8, or removed by the pop function, implemented on line 9. An instance of the class "stack" can be instantiated in a C++ routine by using the statement:
stack s;

Unfortunately, each instance of the class "stack" stores and retrieves only integers from an array of integers. If a stack is desired for storing and retrieving characters, then a different stack class needs to be implemented, as follows:

```
 1 class stack
 2 {
 3     private:
 4         int ptr;
 5         char data[MAX];
 6     public:
 7         void push(int i) {if (ptr >= 0) data[ptr--] = i;};
 8         char pop( ) {if (ptr < (MAX - 1)) return data[++ptr];
 9             else return -10000000;};
10         stack( );
11 };
```

Of course, when both integer and character stacks are required, the names of the two classes would need to differ. Note that almost all of the code required to implement the character stack is identical to the code required to implement the integer stack. Only the return value of the function pop and the data type of the array data are tied to the particular type of data value stored and retrieved from the stack. Therefore, it would seem logical that one should be able to declare a general stack class that could be specifically instantiated for the particular type of data desired to be managed in a stack.

C++ provides the notion of template classes. For example, a template stack class can be declared as follows:

```
 1 template <class C> class stack
 2 {
 3     private:
 4         int ptr;
 5         C data[MAX];
 6     public:
 7         void push(int i) {if (ptr >= 0) data[ptr--] = i;};
 8         C pop( ) {if (ptr < (MAX - 1)) return data[++ptr];
 9             else return -10000000;};
10         stack( );
11 };
12 template<class C> stack<C>::stack( )
13 {
14     ptr = MAX - 1;
15 };
```

The data type of the array, on line 5, and of the return value of the function "pop," on line 8, is declared to be an arbitrary class "C" in the template. The class can be instantiated for a particular data type by specifying that data type in the instantiation command. For example, three different stacks s1, s2, and s3 can be instantiated to hold integers, characters, and doubles, respectively, by the statements:

```
stack<int> s1;
stack<char> s2;
stack<double> s3;
```

Thus, the template class is a type of parameterized generic class that can be instantiated to a particular type of class by specifying the value of one or more template parameters.

More complex parameter specifications and templates are provided by C++, but the simple template described above is sufficient to describe the notion of C++ templates.

In one embodiment of the present invention, a database-management system is enhanced to provide templates for relational-database tables. A template for a relational-database table provides all of the information necessary to create a particular relational-database table, except for a small amount of information encoded in one or more parameters. Subsequently, a particular relational-database table can be instantiated using an instantiation command that specifies the previously created relational-database-table template as well as one or more values for the one or more parameters specified in the template.

Figure 6:
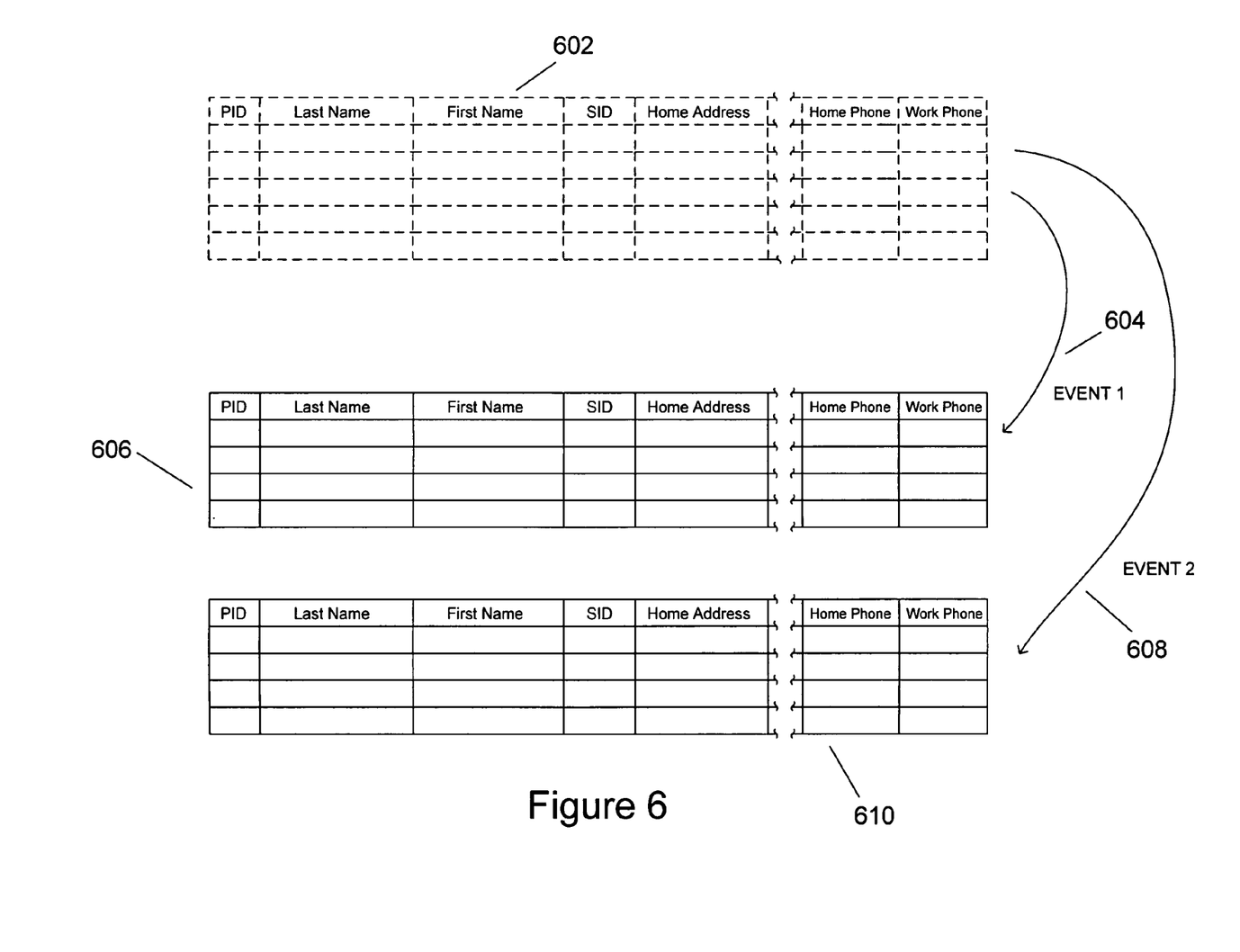
FIG. 6 illustrates the concept of relational-database-table templates that represent embodiments of the present invention.

Instantiation of particular relational-database-tables may be undertaken as a result of the occurrence of events. FIG. 6 illustrates the concept of relational-database-table templates that represent embodiments of the present invention. FIG. 6 shows a template 602 for the relational table "SitePersonnel." The template is shown in dashed lines, to indicate that a template is simply the information needed to create a relational-database table with the form of the SitePersonnel table, including the names and data types of all the columns. However, creation of the template for the relational-database table "SitePersonnel" does not instantiate a relational-database table, as discussed with reference to FIGS. 2-3, but instead involves merely storing the equivalent of the information needed to construct a create-table command, shown above, other than specific information represented by parameters in the template. Subsequently, when a particular first event occurs 604, a particular relational-database table can be instantiated 606 from the relational-database-table template 602 using an instantiation command. Upon the occurrence of a second event 608, a second relational-database table can be instantiated 610 from the relational-database-table template 602 using the instantiation command. The template needs to contain a parameter for the name, or a portion of the name, of a particular relational-database table to be instantiated, since each particular relational-database table within the database must have a unique name.

Comparing FIG. 6 to FIG. 5, it can be seen that template-based instantiation of relational-database tables can effect a horizontal partitioning of an underlying relational-database table. By judiciously instantiating particular relational-database tables as a result of the occurrence of certain events, the horizontal partitioning can be carried out on an on-going, as-needed basis, rather than waiting for overpopulation of an original relational-database table before manually partitioning, or dividing, the original relational-database table among a set of newly created, smaller relational-database tables, or invoking a database-management-system partitioning command. In other words, a template-based approach combined with proper detection and response to events may automatically generate, over time, a desired horizontal partitioning of a logical table without requiring database-performance monitoring, problem detection, and restructuring of an already large relational-database table.

One example of an on-going, anticipatory, efficient logical horizontal partitioning of the table "SitePersonnel" in the above-discussed context is next provided:

```
CREATE TEMPLATE T1
(
    CREATE TABLE Site Personnel_$1
    (
        PID INTEGER PRIMARY KEY,
        LastName    VARCHAR(20),
        FirstName   VARCHAR(20),
        SID INTEGER REFERENCES Sites(SID),
        HomeAddress VARCHAR(100),
        .
        .
        .
        Home Phone  CHAR(12),
        Work Phone  CHAR(12));
);
CREATE TRIGGER newSitePersonnel Table
    AFTER INSERT NEW ROW nr ON Sites
        INSTANTIATE T1 (nr.SID);
```

In the first portion of the above pseudocode example, a new command CREATE TEMPLATE is employed to create a template for the SitePersonnel table. The create-table command is enclosed in parenthesis following the create-template command. The create-template command includes the name of the template, T1, and the name of the table created by the create-table command within the template is parameterized, in part, using the notation "$1." Execution of the create-template command creates a template, identified by the name T1, which can be used to instantiate a particular relational-database table having the form of the above-described SitePersonnel table at any subsequent point in time. The second portion of the above pseudocode examples includes a create-trigger command that essentially creates a database event handler that instantiates a particular instance of the SitePersonnel table, using an instantiate command, whenever a new row is successfully inserted into the relational table "Sites." For example, if a new site is launched by the corporation, and a row inserted into the Sites table for the new site, with the site ID of "5561," then, following insertion of the row, the database-management system automatically creates a new SitePersonnel table named "SitePersonnel_5561." Thus, the logical SitePersonnel table is automatically partitioned, on each insertion of a new row into the Sites table, into a number of relational-database tables with slightly different names.

The above-discussed CREATE TEMPLATE command represents an extension of the SQL query-and-data-definition language. Extension of SQL to support creation of templates and instantiation of templates provides an easy-to-assimilate and natural mechanism for creating and instantiating templates, and takes advantage of the information available to an SQL interpreter or compiler running within the context of a database management system with regard to existing database objects, supported data types, and other such information. Furthermore, the SQL compiler or interpreter can check any of the object creation statements within a CREATE TEMPLATE command to ensure that they are syntactically and semantically correct. Furthermore, the CREAT TEMPLATE command may include multiple object-creation commands, so that an arbitrary collection of objection-creation commands are bundled together in a single template with a single name. For example, were particular triggers, views, and indexes always created for each Site Personnel table, then separate commands for creating all of these objects can be placed together within the outer parentheses of the CREAT TEMPLATE command and separated by semicolons, so that, whenever the template T1 is instantiated, all of the objects, creation statements for which are included in template T1, are instantiated together as a result of executing a single INSTANTIATE command. Interdependencies between the objects can be specified using the template names, such as using the name "Site Personnel_$1" in a CREATE TRIGGER command after the specifier "ON." Thus, any of the many different types of database objects, in addition to tables, can be created by instantiating templates that contain CREATE commands for those objects, and an arbitrary number of CREATE commands can be included in a single CREATE TEMPLATE command.

Although extension of the SQL language one method for providing a template-creation and template-instantiation capabilities to database-management-system users, currently existing database-management-system-provided tools can be used to effect the template-creation and template-instantiation capabilities. As one example, SQL scripts can be written to provide for table-template creation by creating a table containing the desired columns as a template, with the table name employing special characters or naming conventions to allow the table to identified as having been created to serve as a table template. A template-instantiation script can be written to use database-management-system-provided tools for searching for the specially-named tables and determining the data definitions for the specially-named tables. The SQL script can then construct a CREATE TABLE command using the data definition of the appropriate specially named table, substituting a numeric or alphanumeric string for special characters in the template table name. The script can be invoked by a trigger, just as the template T1 is invoked by a trigger in the above-provided pseudocode example. As with the above-discussed SQL-extension-based method, a script-based or programmed approach can be used to create templates for any of the various types of database objects, including tables, views, indexes, triggers, and other database objects as well as to instantiate database objects from the templates.

In certain embodiments of the present invention, the database-management system maps queries to the table name "SitePersonnel" automatically to particular partition tables with extended names. In other words, the selection query for obtaining the work phone number of an employee at a particular site, shown above, would be automatically directed, by the database-management system, to the instance of the SitePersonnel table with a name that includes the SID specified in the query. In alternative embodiments, queries may need to be expressed explicitly in terms of the names of the particular instances of the template T1. For example, the SID for a particular site may need to be extracted from the corresponding entry in the table Sites and then used to form a query directed to the appropriate table that represents an instance of the template T1 by including the SID at the end of a string containing the characters "SitePersonnel_." There are a variety of different ways by which the template mechanism may be implemented within a given database system. For example, in certain embodiments of the present invention, the template mechanism is provided by preprocessing routines, external to the database-management system, rather than by modifying the SQL language or another database query language While the relational-database-table-template entity, discussed above, may be sufficient for handling the above-discussed example of horizontal partitioning, the template mechanism that represents one embodiment of the present invention is, in fact, more powerful. For example, consider the following create-template command:

```
CREATE TEMPLATE T2
(
    CREATE TABLE SitePersonnel_$1
    (
        PID INTEGER PRIMARY KEY,
        LastName      VARCHAR(20),
        FirstName     VARCHAR(20),
        SID INTEGER REFERENCES Sites(SID),
        HomeAddress   VARCHAR(100),
        .
        .
        .
        Home Phone    CHAR(12),
        Work Phone    CHAR(12),
        $2:    SecondWorkPhone    CHAR(12),
        $2:    SecondHomePhone    CHAR(12),
        Picture    $3
    );
)
```

In this case, the "$x" syntax has been used to specify three different parameters. The first parameter is a portion of the name of the table, the second parameter, $2, is a Boolean-value parameter that controls whether or not the line following "$2:" in the above template command is included in the create-table command on instantiation of the template, and the third parameter, $3, stands for the particular type of column "Picture." Thus, any part of the create-table command can be parameterized in a template. A particular instance of the template T2 can be instantiated as follows:

INSTANTIATE TI (61233, TRUE, BLOB(1000));

Thus, in general, the template mechanism can be used to instantiate different instances of a table that may be in somewhat different form, depending on the parameter values specified in an instantiate-template command. The template mechanism, which represents one embodiment of the present invention, can be used to effect various types of horizontal partitioning, vertical partitioning, and even more complex types of relational-database-table partitioning currently unsupported in database management systems.

A second type of embodiment of the present invention provides a partition-by constraint as a new type of constraint under which tables can be created. For example, the table "SitePersonnel" can be created for automatic horizontal partitioning, in certain embodiments of the present invention, by the statement:

```
CREATE TABLE Site Personnel
(
    PID INTEGER PRIMARY KEY,
    LastName      VARCHAR(20),
    FirstName     VARCHAR(20),
    SID INTEGER REFERENCES sites(SID),
    HomeAddress   VARCHAR(100),
    .
    .
    .
    HomePhone    CHAR(12),
    WorkPhone    CHAR(12);
    CONSTRAINT PARTITION BY sites(SID));
```

In this approach, the create-table semantics are modified to allow the table to be initially created for automatic horizontal partitioning based on a column in the same table or another table. In this case, the table "SitePersonnel" is partitioned by the column "SID" of the table "Sites." Whenever a row is entered into the table Sites, a new partition of the table SitePersonnel is automatically created by the database. Of course, the database also provides a full set of management tools to allow the database administrator to specify where the partitions are to be located and how the partitions are to be managed by the database-management system. This second type of embodiment of the present invention is essentially equivalent to the template-based embodiment of the present invention described above. In both cases, horizontal relational-database-table partitioning is carried out automatically, on an on-going, as needed basis, by the database-management system, rather than requiring performance problems to be detected and particular relational-database tables to be manually partitioned using expensive partitioning operations.

Figure 7:
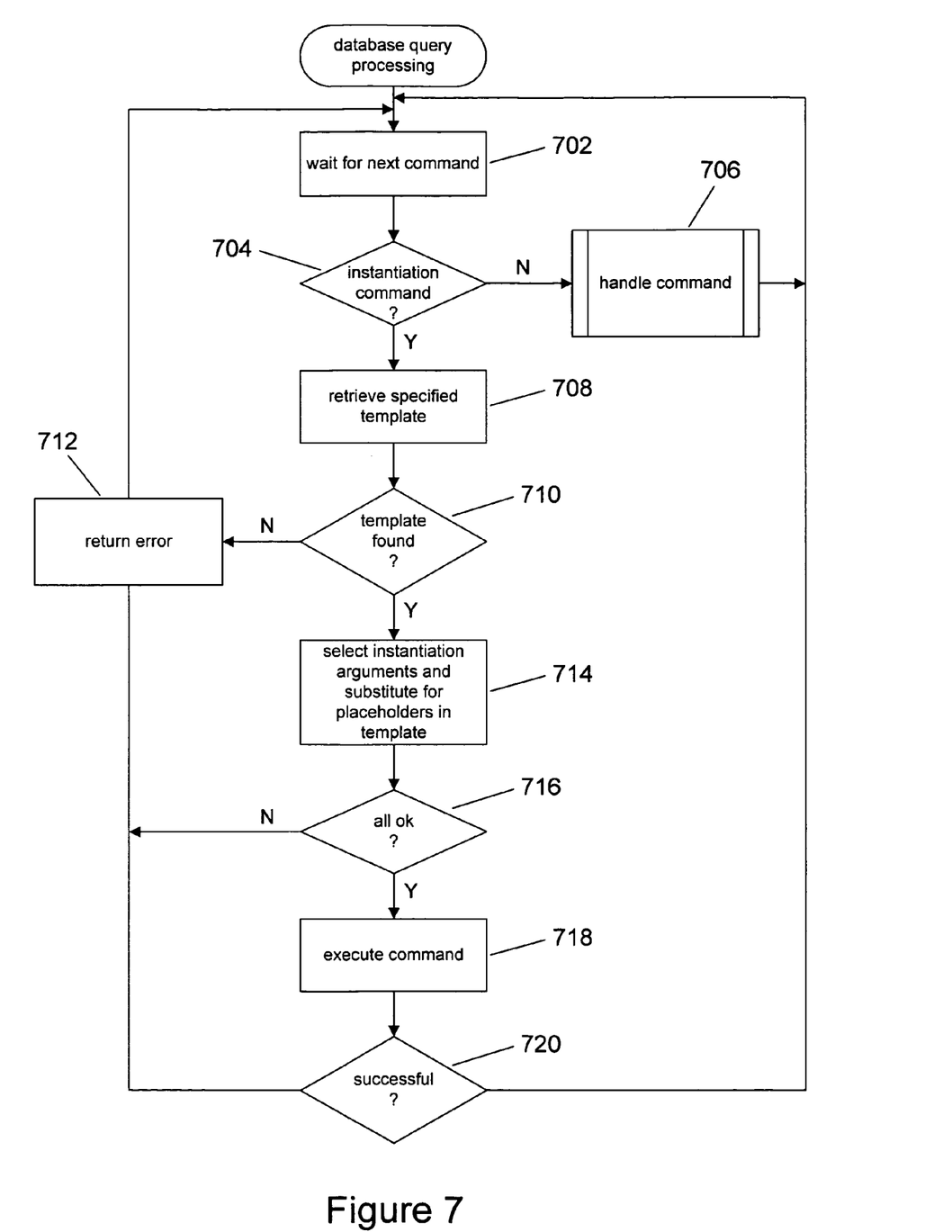
FIG. 7 illustrates implementation of template processing by the query processing component of a database management system according to one embodiment of the present invention.

FIG. 7 illustrates implementation of template processing by the command-processing component of a database management system according to one embodiment of the present invention. In step 702, the command-processing component waits to receive a next query, or command, for processing. When the next command is not an instantiation command, as determined in step 704, the command is handled by normal query-processing methods in step 706. Otherwise, in step 708, the command-processing component retrieves the template specified in the instantiation command from a template repository. Templates may be stored in relational-database tables or in any of various other data-storage components associated with the database-management system. When the specified template is not found, as determined in step 710, an error is returned, in step 712. Otherwise, in step 714, the command-processing component collects all the arguments supplied with the instantiation command, and uses those arguments as substitutes for the symbolic placeholders within the template. When a sufficient number of arguments for making all placeholder substitutions are not included in the instantiation command, as determined in step 716, an error is returned. Otherwise, in step 718, the command-processing component executes the command portion of the template command that now includes substitutions for all placeholder symbols. The command is executed by normal command-execution methods, such as create-table methods. If the command successfully executes, as determined in step 720, then control returns to step 702 for further command and query processing. Otherwise, an error is returned, in step 712, prior to returning to step 702. Processing of the create-template command is straightforward. The text of a parameterized command included within the outer parenthesis of the create-template command is stored in any of various different data-storage components of a database-management system for subsequent retrieval, based on the name of the template, in order to process an instantiate command, as discussed with reference to FIG. 7.

In alternative embodiments of the present invention, templates may be instantiated by higher-level pre-processing routines that process instantiate commands, or their equivalents, as a result of which traditional query-language commands are generated for traditional query processing by the database-management system. It is generally preferred to include template creation and template instantiation within database-query-and-command processing, since database-query-and-command processing is implemented to carry out many related tasks, including ensuring that various constraints and conventions are satisfied during parameter substitution, prior to storing templates created by create-template commands. Ultimately, template creation and template instantiation can be carried out at any of various different levels and within various different logical components of a database-management system, or in related software components of the computer system on which database-management systems execute. In certain embodiments of the present invention, the database-management system may provide additional functionality related to templates, including template retrieval, template editing, and even trial instantiation to ensure correctness.

Figure 8:
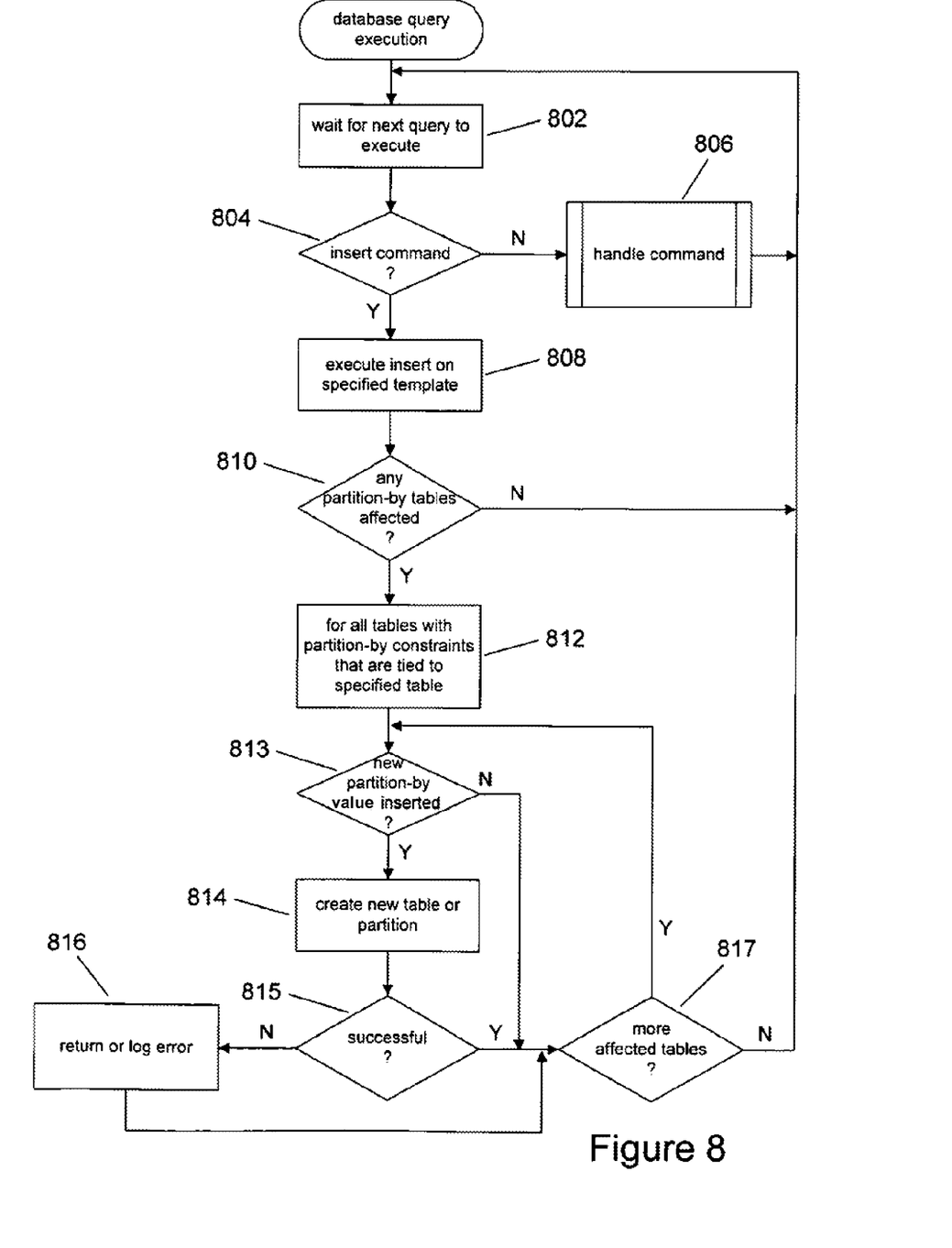
FIG. 8 provides an illustration of an implementation of a second type of embodiment of the present invention, in which the create-table query is modified to allow for configuring the table for on-going partitioning, as discussed above in the last-quoted example.

FIG. 8 provides an illustration of an implementation of a second type of embodiment of the present invention, in which the create-table query is modified to allow for configuring the table for on-going partitioning, as discussed above in the last-quoted example. In step 802, a command-execution component of a database-management system waits for a next command to execute. If the command is not an insert command, as determined in step 804, then the command is handled, in step 806, by traditional methods. Otherwise, in step 808, the insert command is executed on a specified table. Following execution of the insert command, in step 810, the command-execution component determines whether or not any tables created with a partition-by constraint are affected by the just-executed insert command. For all of those tables that may be affected, the for-loop of steps 812-817 is executed to create new partitions for the tables affected. In step 813, the query-execution component determines whether or not a new value has been inserted into the specified table identified by a partition-by constraint in a currently considered table. If so, then a new table or partition is created in step 814. When the table or partition creation is unsuccessful, as determined in step 815, an error is returned in step 816. Thus, the command-processing component monitors row insertion into tables to ensure that, when a unique column value is inserted into a table that was the object of a partition-by constraint, the new partition is created for the table including the partition-by constraint in order to satisfy that constraint. In alternative embodiments of the present invention, additional database commands, such as update and delete commands, may be similarly monitored.

Depending on the particular database implementation, and expectations of designers and users of a database system, a large number of various considerations may need to be made prior to creating a new partition or table in order to satisfy a partition-by constraint. Ultimately, the creation of a new partition or table to satisfy a partition-by constraint must leave the database in a fully consistent state.

To summarize, embodiments of the present invention provide for on-going, as-needed partitioning of relational-database tables in order to provide conflict and bottleneck amelioration from the onset, without relying on performance monitoring and performance-degradation detection and analysis in order to carry out computationally expensive partitioning of already-existing relational-database tables. The on-going partitioning carried out by embodiments of the present invention may be fully automated, and may be implemented in order to satisfy all possible static and dynamic constraints and consistency requirements. One embodiment of the present invention is implemented using database templates, which, like C++ programming-language templates, allows for creation of a parameterized, uninstantiated database object that can be subsequently instantiated according to supplied parameters. While templates are exceedingly useful for implementing on-going relational-database-table partitioning, templates may also be used for a variety of other tasks, including template-based creation of related tables with small variations in data types, columns, constraints, and other such characteristics.

Although the present invention has been described in terms of particular embodiments, it is not intended that the invention be limited to these embodiments. Modifications will be apparent to those skilled in the art. For example, the continuous table-partitioning, template-creation, and template-instantiation features that represent embodiments of the present invention may be implemented using any number of different programming languages, and may vary according to varying any of various programming parameters, including modular organization, control structures, data structures, variable definitions, and other such parameters. Template creation and template instantiation may be implemented in pre-processing components associated with database systems, within database-management-system query-and-command processing components, or within other components of a computer system. The template-based continuous partitioning may include horizontal partitioning and vertical partitioning. Although it is convenient to discuss embodiments of the present invention in the context of relational-database-management systems, the present invention may find application in other types of database-management systems in which partitioning of logical constructs and objects on an on-going, as-needed basis may provide advantages similar to those discussed above with respect to on-going, as-needed partitioning of relational-database tables.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A tangible article of manufacture comprising instructions that, when executed, cause a machine to at least:
monitor a database operation associated with a logical table to detect insertion, in the logical table or a different table, of a row that contains a column having a value not already contained in the column in the logical table or the different table, the monitoring of the database operation to detect the value not already contained in the column of the logical table or the different table initiated in response to a table creation command that includes a partition-by constraint specifying the column; and
in response to detecting the value not already contained in the column of the logical table or the different table, create a next partition for the logical table to include rows of the logical table or the different table that include the value in the column by:
in response to receiving a template-creation command, storing a template in a storage device for subsequent retrieval by a template name specified by the template-creation command, wherein the template includes a database command with one or more symbolic placeholders; and
in response to receiving a template-instantiation command, instantiating the template by:
parsing the template-instantiation command to obtain the template name and one or more template-specified parameters;
retrieving the template corresponding to the template name;
extracting the database command from the template;
substituting the one or more template-specified parameters for the one or more symbolic placeholders in the database command; and
creating the next partition for the logical table according to the retrieved template and the one or more template-specified parameters.

2. The tangible article of manufacture of claim 1 wherein the monitoring of the database operation is initiated after completion of the table creation command.

3. The tangible article of manufacture of claim 1 wherein, when executed, the instructions cause the machine to monitor the database operation to detect the insertion by:
configuring the logical table for the monitoring of the database by creating an event handler to detect the insertion.

4. The tangible article of manufacture of claim 1 wherein, when executed, the instructions cause the machine to create the next partition for the logical table by:
specifying a unique partition name for the instantiated template.

5. The tangible article of manufacture of claim 1 wherein the next partition only stores rows that include the value in the column.

6. The tangible article of manufacture of claim 1 wherein the row is a first row and wherein the instructions, when executed, cause the machine to:
detect, after insertion of the first row, insertion of a second row in the logical table or the different table, the second row including a second value in the column; and
insert the second row in an existing partition associated with the second value for the column, the existing partition having been created before creation of the next partition.

7. A tangible article of manufacture comprising instructions that when executed, cause a machine to at least:
monitor a database operation associated with a logical table to detect insertion, in the logical table or a different table, of a row that contains a column having a value not already contained in the column in the logical table or the different table, wherein the monitoring of the database operation is initiated in response to a table creation command that includes a partition-by constraint specifying the column; and
in response to detecting the value not already contained in the column of the logical table or the different table, create a next partition for the logical table, wherein the next partition for the logical table is created by:
in response to receiving a template-creation command, storing a template in a storage device for subsequent retrieval by a template name specified by the template-creation command, wherein the template includes a database command with one or more symbolic placeholders; and
in response to receiving a template-instantiation command, instantiating the template by:
parsing the template-instantiation command to obtain the template name and one or more template-specified parameters;
retrieving the template corresponding to the template name;
extracting the database command from the template;
substituting the one or more template-specified parameters for the one or more symbolic placeholders in the database command; and
creating the next partition for the logical table according to the retrieved template and the one or more template-specified parameters.

8. The tangible article of manufacture of claim 7 wherein, when executed, the instructions cause the machine to specify a unique partition name for the instantiated template.

9. A method for automatically partitioning a logical table that represents database objects stored in a storage device within a database system, each database object including an attribute value, the method comprising:
monitoring a database operation associated with the logical table to detect insertion, in the logical table or a different table, of a row that contains a column having a value not already contained in the column in the logical table or the different table, wherein the monitoring of the database operation to detect the value not already contained in the column of the logical table or the different table is initiated in response to a table creation command that includes a partition-by constraint specifying the column; and
in response to detecting the value not already contained in the column of the logical table or the different table, creating a next partition for the logical table to include rows of the logical table or the different table that include the value in the column by:
in response to receiving a template-creation command including a template name, storing a template in the storage device for subsequent retrieval by a template name specified by the template-creation command, wherein the template includes a database command with one or more symbolic placeholders; and
in response to receiving a template-instantiation command including the template name, instantiating the template by:
parsing the template-instantiation command to obtain the template name and a template-specified parameter;
retrieving the template corresponding to the template name;
extracting the database command from the template;
substituting the template-specified parameter for one or more of the symbolic placeholders in the database command; and
creating the next partition for the logical table according to the retrieved template and the template-specified parameters.

10. The method of claim 9 wherein the monitoring of the database operation is initiated after completion of the table creation command.

11. The method of claim 9 wherein the monitoring of the database operation to detect the insertion further includes:
configuring the logical table for the monitoring of the database by creating an event handler to detect the insertion.

12. The method of claim 11 wherein the creating of the next partition for the logical table further includes:
specifying a unique partition name for the instantiated template.

13. The method of claim 9 wherein the next partition only stores rows that include the value in the column.

14. The method of claim 9 wherein the row is a first row and the method comprises:
detecting, after insertion of the first row, insertion of a second row in the logical table or the different table, the second row including a second value in the column; and
inserting the second row in an existing partition associated with the second value for the column, the existing partition having been created before creation of the next partition.

* * * * *